Aug. 30, 1955     H. J. M. FÖRSTER     2,716,359
POWER TRANSMISSION DEVICE IN PARTICULAR FOR MOTOR VEHICLES
Filed Feb. 17, 1950
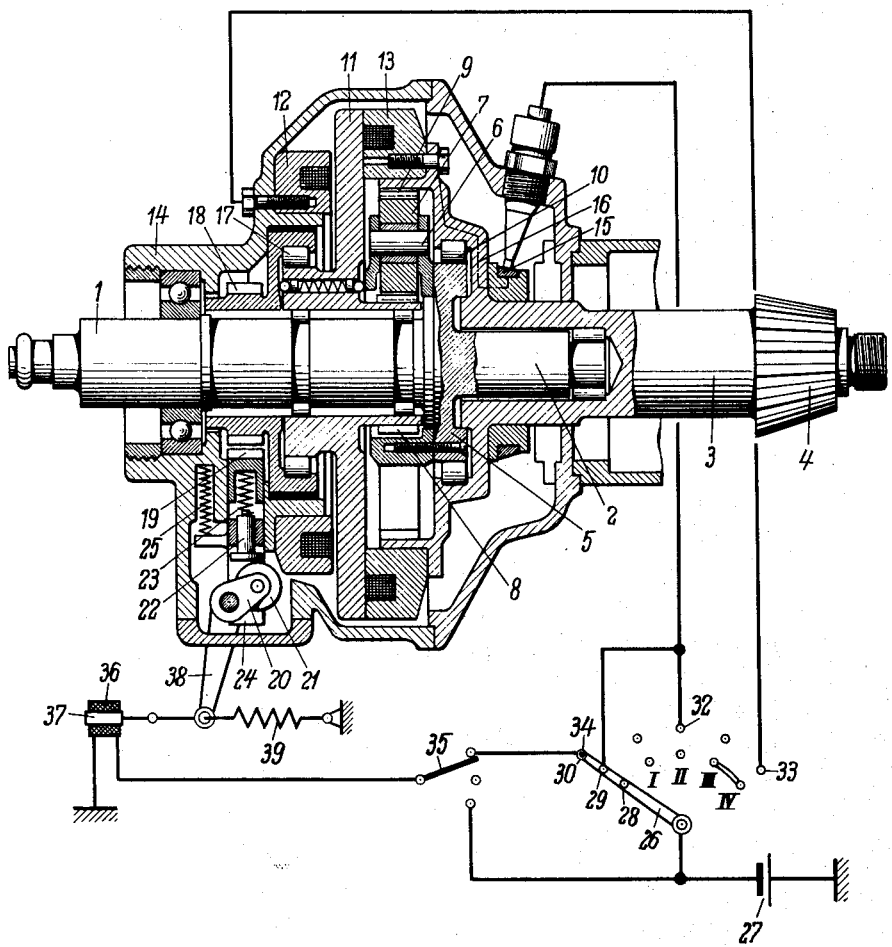
INVENTOR
HANS JOACHIM MAX FÖRSTER
BY Dike and Padlon
ATTORNEYS United States Patent Office — 2,716,359 — Patented Aug. 30, 1955

2,716,359

POWER TRANSMISSION DEVICE IN PARTICULAR FOR MOTOR VEHICLES

Hans J. M. Förster, Harthausen A. F., Kr. Esslingen (Neckar), Germany, assignor to Daimler-Benz Aktiengesellschaft, Stuttgart-Unterturkheim, Germany Application February 17, 1950, Serial No. 144,830

Claims priority, application Germany February 23, 1949

9 Claims. (Cl. 74—781)

This invention relates to a power transmission device, in particular for motor vehicles, and aims above all to an improvement of the driving and shifting conditions by the use of freewheels known as such, being interposed into the drive connection and preferably by utilizing planetary gears. It is a main object of the present invention to facilitate shifting and to increase the safe operation of the vehicle.

Accordingly one feature of the present invention consists in that a freewheel and an electrically operated clutch, such as an electromagnetic clutch, are connected in parallel in such a manner that on the one hand this clutch is acting as a locking device for the freewheel and on the other hand power transmission is maintained in one direction of rotation after the electric clutch has been disengaged or is without current. Such driving arrangement has above all the advantage that the clutch is acting as an easy-to-operate locking device for the freewheel capable of being thrown in or out at any time and therefore offers in a particularly convenient manner the possibility to permit the drive to become effective alternately with or without freewheel action in one direction of rotation, thereby among other things facilitating shifting. The application of an electrically operated or electromagnetic clutch in addition to the above provides above all the advantage that after the interruption of the current, for instance due to a disturbance, drive is maintained automatically at least in one direction of rotation.

The electric clutch and the freewheel may be interposed, for instance, between a driving and a driven element in such a manner that their coupling halves constitute revolving parts of the drive, in particular in connection with an epicyclic gear which can be blocked by the electric clutch in both directions of rotation and by the freewheel in one direction of rotation.

According to a further feature of the present invention, the electrically operated clutch, for instance, the electromagnetic clutch and the freewheel arranged in parallel thereto are interposed as a brake between one gearing element and a relatively stationary part, e. g., the gear casing. In particular also in this case, clutch and freewheel act on a part of a plant or epicyclic gear, an overdrive or another speed being engaged when braking the corresponding driving element through the medium of an electric clutch. It is in this case in particular the purpose of the freewheel in the event of the speed being disengaged by the electromagnetic clutch connected in parallel thereto to lock the driving element not engaged in power transmission in such a manner to the casing or another relatively fixed part, that drive in one direction of drive, e. g., from the engine, inasmuch as this drive is not taken up otherwise, is interrupted, whilst the drive in the inverse direction of rotation is made possible by locking the freewheel. Thereby is obtained, for instance, in applications to motor vehicles, the necessary safety, above all when driving down hill, that in the event of a failure of the other power transmitting means, for instance also in the case of the current supply to the electromagnetic clutch being interrupted, the drive connection between vehicle and engine is maintained, also when the vehicle is not producing a driving action, owing to the locking action of the freewheel so that the engine is capable of acting as a brake.

Another feature of the present invention further consists above all in that in the case of two freewheels acting in opposite directions of drive, i. e., a normal freewheel and oppositely acting freewheel, provision is made to permit locking of the two freewheels by means of electric clutches, in particular electromagnetic clutches, so that an easy locking or unlocking of the two freewheels may take place and also that upon failure or interruption of the electric power supply the drive is maintained in both directions.

A further feature of the present invention resides in that in the case of using in a planetary gear two freewheels acting in opposite directions in particular in such a manner that the one of the two freewheels blocks the planetary gear whilst the other locks one gearing element to the casing, both freewheels are capable of being locked, e. g., by electromagnetic clutches so that the freewheeling action of each of the two freewheels may be suppressed. The speeds thus capable of alternately being engaged produce preferably a direct speed and an overdrive through the medium of the planetary gear. The shifting may be combined with the shifting, for instance, of a superposed main change speed gear in such a manner that part of the forward speeds, e. g., the second speed cooperates with the clutch effecting a direct transmission in the supplementary gearset to be engaged, whilst upon shifting the other forward speeds, e. g., the first and third speeds, said clutch is disconnected, so that the drive is taken up by the freewheel connected in parallel thereto.

By the cooperation of the two freewheels and of the freewheels with the, in particular, electromagnetic clutches connected in parallel thereto there is simultaneously obtained the advantage that backward rolling of the car is prevented even in the event of the main clutch being disengaged. In order to permit a drive of the driving elements that are blocked with relation to the casing in the one direction of rotation by the freewheel, i. e., by the oppositely acting freewheel, also in said direction of rotation, for instance, for engaging a reverse speed in order to permit the car to roll back on a gradient, said freewheel is provided according to a further feature of the invention with an unblocking or unlocking device by means of which the freewheels may be disengaged from the casing. The preferable shifting arrangement in this case being such that the reverse speed can only be engaged in the case of the oppositely acting freewheel being unlocked, i. e., are released for rotation in both directions, and the normal freewheel being locked, i. e., producing a positive driving connection in both directions.

The present invention is above all important in its application to motor vehicles if the gear unit that is cooperating with electromagnetic clutches is arranged at a greater distance from the driver's seat, for instance, at the rear axle or immediately anterior to the same, since also in such case shifting may be effected without difficulty by electrically operated means. The present invention further allows a particularly compact design of the gearset.

Further features of the invention will be apparent after a consideration of the following detailed description of a construction in which, by way of example, the principles of the invention are preferably embodied, such construction relating to a supplementary overdrive gearset interposed between the conventional change speed gear and the rear axle of a motor vehicle. Fig. 1 of the drawing shows such gearset as being designed as an epicyclic gear, it being assumed that in the superposed main change speed gear the reverse speed is engaged, while Fig. 2 shows a schematic arrangement including the parts shown in Fig. 1.

In the drawings, 1 indicates the driving shaft of the supplementary gearset which is driven by the engine through the medium of a conventional change speed gear, e. g., with one reverse and three forward speeds, said driving shaft 1 being connected to the propeller shaft and journaled at its rearward end 2 in the driven shaft 3 which has a pinion 4 for driving the differential gear. The shaft 1 is operatively connected to the planet carrier 5 carrying by means of journals 6 a series, for example, three planet gears 7 in the customary manner. The pinions are enmeshed, on the one hand, with the sun gear 8 which is mounted for free rotation on the shaft 1 and, on the other, with the internal teeth 9 of the drum wheel 10, the latter being operatively connected to the driven shaft 3. The sun gear 8 carries an anchor plate 11 cooperating with the two electromagnetic clutches 12 and 13, the clutch 12 being stationary in the gear housing whilst the clutch 13 is secured to drum wheel 16 and draws its current supply for instance by means of a collector or commutator 15. The operation of the clutches 12 and 13 is diagrammatically illustrated by way of example in the accompanying drawings and will hereinafter be more particularly described.

Between the planet carrier 5 or the driving shaft 1 and the drum wheel 10 or the driven shaft 3 there is interposed a freewheel 16 which is so designed as to provide in the drive of the shaft 1 in the normal forward rotation a direct connection between the driving and the driven shaft by blocking the planetary gear interposed between these two shafts, interrupting, however, the connection between the two shafts in the case of the drive being derived from the vehicle axle, i. e., when the shaft 2 overruns the shaft 1 during forward rotation.

Another freewheel 17 which is operative in the opposite direction of rotation to provide an oppositely acting freewheel, is further interposed between the sun gear 8 and the housing 14. It is so designed as to permit free rotation of the sun gear 8 about its axis if the latter revolves in the same sense of rotation as the driving shaft 1 during the normal driving connection with the engine, whilst rotation of the sun gear 8 in opposite direction will be blocked by the freewheel 17. The outer annular gear of the freewheel 17 is rotatably mounted in the housing 14 and integral with a ratchet wheel 18 which may be engaged by a pawl 19 if the latter is moved inwardly in the radial direction by the lever 20 through the medium of a roller 21, a tappet 22 and a spring 23. In the locking position the lever 20 is urged by the roller 21 toward the tappet 22, in the manner of a bell crank lever. Disengagement of the pawl 19 is effected positively by an arm 24 that is integral with the pawl 19 under the assistance of the spring 25. As disclosed hereinafter by way of example, the lever 20 may be actuated either arbitrarily by the driver or it may be connected to the shifting mechanism for the main change speed gear. The same holds for the electromagnetic clutches 12 and 13, which may be actuated eventually also automatically in connection with an automatic shifting mechanism of the main change speed gear.

As to the mode of operation of the gear mechanism, there are 4 possibilities of drive:

(a) The engine drives the shaft 3 through the medium of the shaft 1 in the forward direction of rotation and therewith drives the car forwardly constituting the normal forward driving condition, (b) Inversely, the car drives the shaft 1 in the forward direction of rotation by means of the shaft 3 and therewith eventually drives the engine, for example, when going down hill with the engine acting as a brake, (c) The engine drives the shaft 3 through the shaft 1 in the rearward direction of rotation and thus the car (normal rearward driving), (d) The car inversely drives the shaft 1 through the shaft 3 in the rearward direction of rotation and thus eventually the engine, for example, when rolling rearwardly down hill.

For each of these 4 possibilities there are three shifting possibilities:

(1) Both the clutch 12 braking against the housing and the clutch 13 arranged in the driving connection are disengaged (currentless).

(2) The clutch 12 is disconnected and the clutch 13 engaged (current-carrying).

(3) The clutch 12 is engaged and the clutch 13 disconnected.

The fourth shifting possibility with both clutches engaged does not result in a driving possibility and brakes in every case the entire drive.

The effects resulting for the freewheel 16 and for the oppositely acting freewheel 17 and therewith for the drive as such will be evident from the following table.

| car drives | type of drive | freewheel 17 | freewheel 16 | results and remarks |
|---|---|---|---|---|
| forwardly | (a) engine drives car forwardly (shaft 1 drives): | | | |
| | case ($a_1$) braking clutch 12 out, drive clutch 13 out. | unlocked | self-locking | directly forward. |
| | case ($a_2$) 12 out, 13 in | do | locked by 13 | Do. |
| | case ($a_3$) 12 in, 13 out | locked by 12 | unlocked | overdrive forward. |
| | (b) car drives forwardly (shaft 1 driven forwardly): | | | |
| | case ($b_1$) 12 out, 13 out | self-locking | do | overdrive car/engine. |
| | case ($b_2$) 12 out, 13 in | unlocked | locked by 13 | directly car/engine. |
| | case ($b_3$) 12 in, 13 out | locked by 12 | unlocked | overdrive car/engine |
| | (c) engine drives rearwardly (shaft 1 drives rearwardly): | | | |
| | case ($c_1$) 12 out, 13 out | self-locking | self-locking | drive blocked, no drive when unlocked. |
| rearwardly | case ($c_2$) 12 out, 13 in | self-locking, must be unlocked | locked by 13 | directly rearward. |
| | ($c_3$) 12 in, 13 out | locked by 12 | self-locking | drive blocked. |
| | (d) car driven rearwardly (shaft 1 rearwardly driven): | | | |
| | case ($d_1$) 12 out, 13 out | self locking, must be unlocked | do | directly rearward car/engine. |
| | case ($d_2$) 12 out, 13 in | do | locked by 13 | Do. |
| | case ($d_3$) 12 in, 13 out | locked by 12 | self-locking | drive blocked. |

During the normal operation of the vehicle of the drive (case $a$), i. e., when the vehicle is driven by the engine in one of the forward speeds a direct transmisison is obtained when both electromagnetic clutches are currentless as well as when the clutch 13 is current-carrying. In the former case ($a_1$) the gearing is locked together with the driving and the driven shaft for common rotation owing to the locking action of the freewheel 16, the locking action being suppressed, however, upon reversal of the direction of drive (case $b_1$), i. e., with the vehicle driving, since simultaneously the oppositely acting freewheel 17 is locked to the casing thereby effecting an overdrive in the inverse direction of drive, i. e., from 3 through 10, 9, 7, 6, 5, to 1. In the second case ($a_2$) the gearing is locked by the current-carrying clutch 13 to form a revolving unit, it being immaterial whether the drive be effected from the engine or from the vehicle when the vehicle moves in a forward speed (cases $a_2$ and $b_2$). In that case the clutch 13 acts as locking device for the freewheel 16.

The overdrive is thrown in when the clutch 13 is disengaged and the clutch 12, which acts as locking device for the freewheel 17, is engaged, i. e., current-carrying, thereby locking the sun gear 8 to the casing also in the forward direction of rotation thereof, so that the drive from the shaft 1 through the planetary gear 5, 6, 7, 9, 10 to 3 is stepped up to overdrive (case $a_3$). The reversal of the direction of drive (case $b_3$) will not effect any change in this overdrive gear ratio.

Shifting may now be effected in such a manner that for every speed of the main change speed gear alternatively the one or the other or two in succession or all of the three aforementioned possibilities of shifting may be used. However, there may also be provided a combination with the shifting of the manually or automatically operated main change speed gear in such a manner, that part of the speeds of the latter, e. g., the first and third or direct speeds, operate without locking the freewheel 16 by means of the electromagnetic clutch 13, said clutch being current-carrying only in another part of the speeds, for example, in the second and reverse speeds. The overdrive may in this case be thrown in as fourth speed by using the direct drive of the main change speed gear and connecting the clutch 12.

Such shifting arrangement is illustrated in the drawing by way of example. A switch lever 26, to which current is supplied from a power source 27, is provided with contacts 28, 29, 30, of which the contact 28, e. g., shifts the different speeds such as reverse speed R and forward speeds I to IV, of the main change speed gear while the contact 29 cooperates with the fixed contacts 31, 32, 33 in such a manner that in the reverse and in the second speeds the contacts 31 and 32 respectively and consequently the clutch 13 are connected to the power supply, whilst in the fourth speed the clutch 12 is connected through contact 33. In passing from the third to the fourth speed and inversely the shifting condition of the main change speed gear remains, for instance, unchanged as indicated by the common contact III–IV.

Owing to the fact that in the first and third speeds the clutch 13 is disconnected, there is obtained the advantage that in the case of the car driving the engine (corresponding to the example selected) in the first speed the strong braking action of the engine is lessened and in the third gear there will be an economy of fuel since at the moment of the reversal of torque the freewheel 16 is unlocked and therewith the overdrive engaged by locking the torque at the oppositely acting freewheel 17. Thus there will be an automatic passing from the case $a_1$ to the case $b_1$ of the table. On the other hand, the second speed with the clutch 13 being connected offers the possibility to operate with direct drive transmission in the supplementary gearset both when the engine drives (case $a_2$) and when the car drives (case $b_2$) in order to have a strong braking action of the engine. The second speed generally—e. g. when rolling down hill—is particularly suitable for this purpose.

The shifting arrangement so far described, for example, with the ratchet gearing 18, 19 being engaged, however, would not permit backing of the car, be it that the car is driven by the engine or that the car is intended to roll backwardly on a gradient by its own weight. If the freewheel 17 is locked by the ratchet gearing 18, 19 the car cannot drive or be driven rearwardly as appears from the table under $(c)$ and $(d)$, since either both freewheels 16, 17 in common (cases $c_1$, $d_1$) or one of the same in connection with the clutch 12 and 13 associated with the other freewheel (cases $c_3$, $d_3$ and $c_2$, $d_2$ respectively) block the gearing as a whole and thus brake the drive in total. Thereby the advantage is obtained that the car is secured against rolling backwardly. However, in order to be able to engage the reverse speed or to permit the car to roll backwardly down hill, the ratchet gearing 18, 19 must be unlocked which may be effected automatically by engaging the reverse speed or by means of a particular control device actuated by the driver eventually also in addition to the automatic actuation. The ratchet gearing can be unlocked, preferably, only in such cases in which the clutch 12 is not simultaneously locked or if the unlocking does not produce any drive at all, as in the case $c_1$. As viewed in the table, this will happen in the cases $c_2$, $d_2$ and $d_1$. In order to produce the reverse speed in both directions of drive, i. e. both when the engine and when the car drives, it is appropriate that the reverse speed can be engaged only when the clutch 13 is current-carrying which, though permitting the engagement of the reverse speed only in direct driving connection, as in the illustrated embodiment, is, however, in general advantageous and sufficient with respect to the higher torque obtained thereby. In the illustrated embodiment this is obtained, for example, by connecting the contact 30 at the lever 26 with a fixed contact 34 from which the current is conducted over the switch 35 to the coil 36 effecting through the medium of the core 37 the displacement of the lever 38 towards the left thus unlocking the ratchet gearing 18, 19. A spring 39 retracts the lever 38 into its original position when the coil is again currentless. The switch 35, which, however, can also be omitted, offers the possibility of unlocking or locking the oppositely acting freewheel 17 by means of the ratchet gearing 18, 19 alternately to the casing at will or to effect unlocking only in the reverse speed. The latter case is illustrated in the drawing in which the reverse speed is engaged and the oppositely acting freewheel 17 unlocked, the freewheel 16 being locked by the clutch 13.

There is further a particular advantage in connection with the gear unit in that with the car standing on a gradient all speeds of the superposed main change speed gear can be shifted without difficulties due to the freewheeling action of the supplementary gearset, and the car can be started by engaging the disengaged main clutch.

In Fig. 2, it will be noted that there is provided a motor 40, transmission gearing 41 in front of planetary gearing 14 and the axle gearing 42 behind said gearing 14. The shifting of the gearing in this drawing is the same as in the case of Fig. 1. The individual gears (gear ratios) are shifted in a well-known manner by electrically actuated couplings to which current is fed through the lines 42, 43, 44 and 45 which are connected to contacts "R" I, II, III and IV respectively, as further shown in Fig. 1.

The present invention is not limited to the illustrated embodiment. It is possible, for instance, to effect locking of the two freewheel clutches also hydraulically, pneumatically, mechanically or in any other suitable manner. The gear unit may further be stepped down instead of being stepped up by reversal of driving and driven shaft. In that case the freewheeling units would also interchange their respective functions in such a manner that, for example, the freewheel locking one gearing element to the casing would act as normal freewheel for the transmission of drive from the engine to the driving axle, and the blocking freewheel as an oppositely acting freewheel. The blocking freewheel may further be arranged also between two other gearing elements of the planetary gear, for example, between one of the two shafts 1 and 3 or the planet carrier 5 on the one hand, and the sun gear 8, on the other, or in any other desired manner provided a blocking of the gear unit or the engagement of a corresponding speed will be effected thereby. It is further possible to effect shifting, for example, in connection with a superposed change speed gear, such as a main change speed gear or a reversing gear in any other suitable manner e. g. also automatically.

What I claim is:

1. A transmission mechanism with a plurality of elements comprising a driving element, a driven element, a freewheeling device self-locking in one relative direction of rotation between said driving element and said driven element, a counter-freewheeling device between two of said elements self-locking in the opposite relative direction of rotation, electric engaging means between said driven element and one other of said elements for effectively locking said counter-freewheeling device in said opposite relative direction of rotation, another electric engaging means for effectively locking said counter-freewheeling device in said one relative direction of rotation, and unlocking means for selectively unlocking said counter-freewheeling device in said opposite relative direction of rotation.

2. A transmission mechanism with a plurality of elements comprising a driving element, a driven element, a freewheeling device self-locking in one relative direction of rotation between said driving element and said driven element, a counter-freewheeling device between two of said elements self-locking in the opposite relative direction of rotation, engaging means between said driven element and another of said elements for effectively locking said freewheeling device in said opposite relative direction of rotation, another engaging means for effectively locking said counter-freewheeling device in said one relative direction of rotation, and unlocking means for selectively unlocking said counter-freewheeling device in said opposite relative direction of rotation.

3. A transmission mechanism comprising a driving element, a driven element, transmission means having a plurality of elements for connecting said driving element with said driven element including a freewheeling device self-locking in one relative direction of rotation between said driving element and said driven element and a counter-freewheeling device between two of said elements self-locking in the opposite relative direction of rotation, electric engaging means between said driven element and another of said elements for effectively locking said first-mentioned freewheeling device in said opposite relative direction of rotation, another electric engaging means for effectively locking said counter-freewheeling device in said one relative direction of rotation, and unlocking means for selectively unlocking said counter-freewheeling device in said opposite relative direction of rotation including an engaging member and means to provide a positive lock between said engaging member and a portion of said counter-freewheeling device.

4. The combination according to claim 3, wherein said portion of said counter-freewheeling device includes an external gear engaged by said engaging member during locking thereof.

5. A transmission mechanism comprising a relatively stationary part, a planetary gear with a driving gear element, a driven gear element, and an intermediate gear element, a freewheel device intermediate two of said gear elements for locking the drive in one relative direction of rotation, a freewheeling device intermediate said intermediate gear element and said relatively stationary part for locking the drive of said intermediate gear element in a direction of rotation opposite to the direction of rotation thereof caused by locking of said first-mentioned freewheeling device, clutch means between said driven gear element and another one of said gear elements for effectively locking said first-mentioned freewheeling device in the relative direction of rotation opposite to said one relative direction of rotation, engaging means for effectively locking said second-mentioned freewheeling device in the relative direction of rotation ordinarily unaffected thereby, and unlocking means for selectively rendering ineffective said second-mentioned freewheeling device.

6. A transmission mechanism comprising a planetary gear having a plurality of gearing elements and two electromagnetic engaging means, one of said engaging means being connected between one gearing element and another gearing element, and the other of said engaging means being connected between said one gearing element and a stationary part of the transmission, a freewheeling device between said second-mentioned gearing element and a further gearing element of said planetary gear, a second freewheeling device operative in the opposite direction from said first-mentioned freewheeling device between said first-mentioned gearing element and said stationary part, and mechanical means for selectively rendering ineffective said second freewheeling device irrespective of the electric energization of a corresponding engaging means.

7. A transmission mechanism comprising a planetary gear as defined in claim 6 wherein the first mentioned gearing element constitutes the sun gear and the secondly mentioned gearing element constitutes the external gear, the sun gear being provided with a disk-shaped anchoring member serving on the one hand for establishing an electromagnetic connection to the external gear and on the other for establishing an electromagnetic connection to the stationary casing.

8. A transmission mechanism according to claim 1, further comprising a housing for the transmission, wherein one of said elements is a sun gear, and another one of said elements is connected with said housing, said counter-freewheeling device and said second-mentioned engaging means being arranged between said sun gear and said another element.

9. In a variable speed transmission the combination comprising a housing, an epicyclic gear composed of three elements formed by two solar gears and by a planetary gear carrier, means for mounting said three elements in said housing for rotation about substantially a common axis, planetary gears mounted on said carrier in permanent mesh with said solar gears, means for directly clutching two of said elements together for low speed transmission, means for connecting one of said elements to said housing for high speed transmission, a first one-way connecting device provided between two of said three elements, a second one-way connecting device between said housing and the third one of said elements, and means for selectively disabling said second one-way connecting device, one of said last-mentioned two elements including one of the first-mentioned two elements.

References Cited in the file of this patent

UNITED STATES PATENTS

| | | |
|---|---|---|
| 2,012,377 | De Normanville | Aug. 27, 1935 |
| 2,097,021 | De Normanville | Oct. 26, 1937 |
| 2,212,278 | Sinclair | Aug. 20, 1940 |
| 2,251,464 | Neracher et al. | Aug. 15, 1941 |
| 2,262,959 | Osborne | Nov. 18, 1941 |
| 2,371,564 | Wemp | Mar. 13, 1945 |
| 2,372,734 | Orr | Apr. 3, 1945 |
| 2,524,975 | Hobbs | Oct. 10, 1950 |
| 2,533,056 | Selby | Dec. 5, 1950 |
| 2,549,125 | Paton | Apr. 17, 1951 |

FOREIGN PATENTS

| | | |
|---|---|---|
| 441,424 | Italy | Nov. 2, 1948 |
| 472,953 | Great Britain | Oct. 4, 1937 |
| 779,853 | France | Apr. 13, 1935 |